3,280,061
COMPOSITION COMPRISING (1) POLYVINYL ACETATE, (2) THE GLYCERYL OF MALEIC ANHYDRIDE TREATED ROSIN, (3) WAX, AND (4) A PARTICULATE ANTIBLOCKING AGENT
Robert Louis Favreau, Clinton, Iowa, assignor to E. I. du Pont de Nemours and Company, Wilmington, Del., a corporation of Delaware
No Drawing. Filed Mar. 3, 1964, Ser. No. 349,128
12 Claims. (Cl. 260—27)

This invention relates to release sheet useful during molding of plastic articles. In particular, it relates to a novel coating composition and to regenerated cellulose release sheet which carries this coating.

In fabrication of certain types of plastic sheets, panels, and other molded articles when the plastic tends to stick to the mold, it has been found necessary to use a mold release sheet which serves to prevent contact between the plastic and the mold. The release sheet should preferably have a small but finite degree of adhesion to the plastic article so that it will remain with the article to protect its surface during storage, shipping, and further fabrication, but yet be capable of being readily and easily stripped from the article when desired. The release sheet must not adhere to the article so strongly that it cannot be removed, or so strongly that it tears into small bits and pieces as it is removed, thus requiring a great deal of time for its removal. For best results a release sheet should require a peel force of about 1 g. to about 5 g./1.5 in. of width for its removal.

Typical articles which require the use of release sheet during fabrication include glass fiber reinforced polyester panels and acrylic panels.

Other requirements of release sheet are that it should be dimensionally stable, have uniform gauge and good sheet flatness, and be free from buckles, wrinkles, and stretched lanes.

Uncoated regenerated cellulose film has been utilized as mold release sheet but its use entails certain disadvantages. One disadvantage encountered with uncoated regenerated cellulose film is its lack of dimensional stability. This type of film undergoes marked expansion and shrinkage as a result of its varying moisture content as the relative humidity changes. The lack of dimensional stability becomes manifest as wrinkles and folds in the sheet which are reproduced in the surface of the molded article, thus leading to unacceptable or reject moldings.

Another disadvantage of uncoated regenerated cellulose film is its proclivity to lose the softener which it contains by volatilization. Loss of softener, as is well known, results in embrittlement of the film. Brittle film tends to shatter and break during the molding operation, and tends to break and tear as it is removed from a molded panel, requiring a great deal of time, and trying the patience of the person performing the operation. Loss of softener can occur during storage of the release sheet before use, and especially after fabrication of the panel, during storage before the release sheet is removed, when the whole area of the release sheet is exposed to the atmosphere. Also, for some types of molding operations, the release sheet is sometimes subjected to high temperatures before use for the purpose of preshrinking, during which some of the softener is volatilized. Coated films do not suffer softener losses nearly as great as those of the uncoated films, and thereby tend to embrittle at a much slower rate than the uncoated films. However, known coated regenerated cellulose films are unsatisfactory for this use because they do not release properly from the molded and cured articles.

It is therefore an object of this invention to provide a mold release sheet which overcomes the deficiencies of known release sheets. Another object is to provide a novel coating composition which possesses the release characteristics desired and which when coated on the regenerated cellulose base sheet adheres well, and provides a film exhibiting improved dimensional stability over uncoated release sheet.

These and other objects are accomplished by the present invention which comprises a coating composition for regenerated cellulose film which consists of about 60 to 92% by weight of polyvinyl acetate, about 5 to 35% by weight of a hard blending resin, about 0.1 to 6% by weight of a wax and about 0.1 to 1% by weight of a particulate antiblocking agent. It is preferred that polyvinyl acetate constitute from 70 to 90% by weight of the coating, and that the hard blending resin constitute from 10 to 25% by weight of the coating.

Although polyvinyl acetate possesses characteristics of good release from many other substances, cellophane coated with polyvinyl acetate exhibits severe blocking tendencies, and thus is not functional. This invention resides in the discovery of means for making a functional non-blocking coating based on polyvinyl acetate.

The polyvinyl acetate polymer employed preferably has a viscosity from about 25 centipoises to about 300 centipoises as measured at a concentration of 86 g. per 1000 ml. of solution in benzene at 20° C. in a Brookfield viscometer. This viscosity range for polyvinyl acetate corresponds to a molecular weight between about 100,000 and 450,000. Polymers having higher and lower viscosities may also be used, however, including polymers with a viscosity as low as about 5 centipoises (molecular weight about 25,000) and as high as about 700 centipoises (molecular weight about 600,000).

The hard blending resin is preferably the glyceryl ester of maleic anhydride treated rosin.

A wax is incorporated into the coating composition in order to impart surface slip to the film so that it may be easily handled during winding and unwinding operations such as slitting of rolls. Although paraffin wax is a preferred wax, a wide variety of other waxes may be used including montan wax, beeswax, palm wax, ozokerite, pentaerythritol tetrastearate, Japan wax, carnauba wax, castor wax, candelilla wax, spermaceti and others.

The coating composition also includes a particulate material which serves as an antiblocking agent. Any inert substance insoluble in the solvent employed for the coating operation may be used, such as aluminum silicate clay, calcium silicate, mica, polystyrene, etc., as long as the particles are sufficiently small.

The coating is prepared as a lacquer containing from 5 to about 25% by weight solids. Solvents which may be used include benzene, toluene, xylene, tetrahydrofuran, esters such as ethyl acetate and butyl acetate, ketones such as acetone and methyl ethyl ketone, lower alcohols such as ethyl and propyl alcohols, and the like. Although a single organic solvent may be used, mixtures of such solvents may be employed, and frequently the properties of the coating are improved by so doing.

The coating composition of this invention may be applied onto base sheet in any known type of coating apparatus capable of handling lacquers dissolved in organic solvents. The coating may be metered in known ways by use of such apparatus as doctor rolls, doctor knives, air knives, gravure rolls and the like.

The unit weight of the cellulose base sheet employed is not critical and may be as low as 25 g./sq. meter or lower, or as high as 50 g./sq. meter or greater. The base sheet is softened with a polyhydric alcohol, such as propylene glycol, hexylene glycol, glycerol, or mixtures thereof. Generally about 8 to 20% by weight softener is employed although higher or lower amounts may also be used. The preferred softener is glycerol.

Generally a base sheet containing no anchoring resin is used. However, if greater adhesion and heat sealability are desired a small amount of anchorage resin may be incorporated into the base sheet. When used, the resin may be a polyalkylenimine having from 2 to 8 carbon atoms such as polyethylenimine or polypropylenimine, or a thermosetting resin such as urea-aldehyde, melamine-aldehyde, guanidine-urea-formaldehyde or other similar types of thermosetting resin well known in the art.

The amount of coating applied to the base sheet generally will amount to from about 1 g./sq. meter to about 3 g./sq. meter distributed approximately equally on the two sides of the film. However, in some cases as much as about 6 g./sq. meter may be employed.

This invention has been described in terms of coating a regenerated cellulose base sheet. It is intended that the latter term apply to cellulose sheets regenerated from sodium cellulose xanthate (viscose), from cupra-ammonium cellulose, and from solutions in inorganic salts such as calcium thiocyanate. It should also be apparent, however, that the coatings of this invention are useful when applied to other hydrophilic base sheets such as methyl cellulose, ethyl cellulose, hydroxyethyl cellulose, hydroxypropyl cellulose, polyvinyl alcohol, and partially hydrolyzed ethylene/vinyl acetate copolymers.

The following examples illustrate preferred embodiments of the invention but are not intended to serve as limitations thereon in the appended claims. All parts and percentages are given by weight unless otherwise specified.

*Example I*

A regenerated cellulose sheet having a unit weight of 44 g./sq. meter and containing 14% glycerin softener was coated with a coating lacquer having the following composition:

| | Parts |
|---|---|
| Polyvinyl acetates | 80.5 |
| Glyceryl ester of maleic anhydride treated rosin | 16.0 |
| Paraffin wax | 3.0 |
| Pulverized aluminum silicate clay | 0.5 |
| Tetrahydrofuran | 585 |
| Toluene | 315 |

Sufficient lacquer was applied to give a coating weight of 2.1 g./sq. meter after drying.

The film was rated as Grade 1 in the blocking test and was more easily processed than uncoated regenerated cellulose film through the slitting and other handling operations. When used as a relase sheet in fabrication of glass fiber reinforced polyester panels it exhibited excellent sheet flatness, much improved over uncoated regenerated cellulose release sheet, and required a force of 1.5 g./1.5 in. of film width to separate the sheet from the panel.

Blocking is determined by preparing a stack of 30 to 32 sheets of film, 3½ in. x 4 in., piled front to back throughout the stack. The stack is placed between two 3½ in. x 4 in. sheets of chipboard and wrapped in waxed kraft paper. The package is placed on a smooth sheet of metal at least ⅟₁₆ in. thick and approximately 6 in. square. A 3½ in. x 4 in. lead weight with a smooth face and having a weight of 4.6 lbs. (⅓ lb./sq. in.) is accurately placed on the package of sheets, and the entire assembly is placed in an oven maintained at 45° C. for 24 hours, though no appreciable differences in matting result from retaining them in the oven for considerably longer periods such as 3 or more days. The packages of sheets are removed from the oven and allowed to cool to room temperature (one hour or more) after which they are graded. The package of sheets is carefully unwrapped, the chip-board removed and the stack of sheets is grasped by thumb and forefinger in the center of the stack. A shearing force is then applied with care taken to avoid bending the stack or disturbing its edges. The stack is graded as follows:

Grade 1—the sheets slide apart individually with no tendency whatever to cling together.

Grade 1+—the sheets slide apart individually but with perceptable cling.

Grade 2—the stack separates into 2 or more groups of sheets which remain moderately firmly matted together.

Grade 2+—the stack separates on application of the maximum force into 2 or more groups of sheets which are firmly matted together.

Grade 3—the stack cannot be separated by straight force.

Note: Easy separation of the top and bottom sheets in grades 2, 2+, and 3 should be disregarded. In grades 2, 2+ and 3 the film is said to have "blocked" with varying degrees of severity.

The force required to strip the release sheet from the molded article is conveniently measured by selecting a specimen of the article carrying the release sheet, cutting through the release sheet two straight parallel cuts spaced 1.5 inches apart, initiating the stripping of the sheet in a direction parallel to the cuts, and measuring in a Suter testing machine the force required to continue stripping the 1.5 inch lane of sheet at a pull rate of 20 in./minute.

*Example II*

A regenerated cellulose sheet having a unit weight of 30.8 g./sq. meter and containing 11.9% glycerin softener was coated with a lacquer having the following composition:

| | Parts |
|---|---|
| Polyvinyl acetate | 76.2 |
| Glyceryl ester of maleic anhydride treated rosin | 22.0 |
| Carnauba wax | 1.2 |
| Pulverized aluminum silicate clay | 0.6 |
| Tetrahydrofuran | 585 |
| Toluene | 315 |

Sufficient lacquer was applied to give a coating weight of 1.7 g./sq. meter after drying.

The film was rated as Grade 1 in the blocking test and was easily handled during further processing. When used in fabrication of polyester panels a force of 2.5 g./1.5 in. of film width was required to strip the sheet from the panel.

*Example III*

A regenerated cellulose sheet like that of Example I was coated with a coating lacquer having the following composition:

| | Parts |
|---|---|
| Polyvinyl acetate | 91.5 |
| Glyceryl ester of maleic anhydride treated rosin | 5.0 |
| Paraffin wax | 3.0 |
| Pulverized aluminum silicate clay | 0.5 |
| Tetrahydrofuran | 585 |
| Toluene | 315 |

Sufficient lacquer was applied to give a coating weight 2.3 g./sq. meter after drying.

The film was rated as Grade 1+ in the blocking test. When used in fabrication of polyester panels a force of 2.0 g./1.5 in. of film width was required to strip the sheet from the panel.

*Example IV*

A regenerated cellulose film like that of Example I was coated with a coating lacquer having the following composition:

| | Parts |
|---|---|
| Polyvinyl acetate | 96.5 |
| Paraffin wax | 3.0 |
| Pulverized aluminum silicate clay | 0.5 |
| Tetrahydrofuran | 585 |
| Toluene | 315 |

Sufficient lacquer was applied to give a coating weight of 2.0 g./sq. meter after drying.

The film was rated Grade 3 in the blocking test.

The coating composition of this invention provides a novel means for preparing a mold release sheet which eliminates the pronounced blocking tendencies of polyvinyl acetate coatings. One advantage over known release sheets is improved sheet flatness and resistance to wrinkling and folding. Another advantage is its reduced tendency to embrittlement caused by softener loss. Another advantage is improved gloss of the sheet, which in turn confers on the molded article improved surface gloss. Other advantages include ease of handling the film during processing, as in slitting operations, and the associated increase in production rates which becomes possible as a result of the improved handling properties. Further advantages will be obvious to those skilled in the art.

It is apparent that many variations and modifications of this invention may be accomplished without departing from the spirit of the present invention which is accordingly intended to be limited only by the scope of the appended claims.

What is claimed is:

1. A coating composition for regenerated cellulose film consisting essentially of about 60–92% by weight of polyvinyl acetate homopolymer, about 5 to 35% by weight of the glyceryl ester of maleic anhydride treated rosin, about 0.1 to 6% by weight of a wax and about 0.1 to 1% by weight of a particulate antiblocking agent.

2. The coating composition of claim 1 wherein the wax is paraffin wax.

3. The coating composition of claim 1 wherein the particulates anti-blocking agent is aluminum silicate clay.

4. The coating composition of claim 1 wherein the polyvinyl acetate homopolymer has a viscosity of from about 25 to about 300 centipoises.

5. A coating composition for regenerated cellulose film consisting essentially of about 70 to 90% by weight of polyvinyl acetate homopolymer, about 10 to 25% by weight of the glyceryl ester of maleic anhydride treated rosin, about 0.1 to 6% by weight of a wax and about 0.1 to 1% by weight of a particulate anti-blocking agent.

6. A coating compositilon consisting of essentially about 70–90% by weight of polycinyl acetate homopolymer having a viscosity of 5 to 700 centipoises, about 10 to 25% by weight of the glyceryl ester of maleic anhydride treated rosin, about 0.1 to 6% by weight of paraffin wax and about 0.1 to 1% by weight of a particulate antiblocking agent.

7. A coating lacquer for regenerated cellulose base sheet consisting essentially of (1) about 75 to 95 parts by weight of solvent and (2) about 5 to 25 parts by weight of a coating composition consisting of 60–92% by weight of polyvinyl acetate homopolymer, 5 to 35% by weight of the glyceryl ester of maleic anhydride treated rosin, 0.1 to 6% by weight of a wax and 0.1 to 1.0% by weight of an inert substance insoluble in said solvent.

8. The coating lacquer of claim 9 wherein said solvent is a mixture of tetrahydrofuran and toluene.

9. A mold release sheet useful during molding of plastics comprising regenerated cellulose base sheet and from about 1 gram per square meter to 6 grams per square meter of a coating having a composition of about 60–92% by weight of polyvinyl acetate homopolymer, about 5 to 35% by weight of the glyceryl ester of maleic anhydride treated rosin, about 0.1 to 6% by weight of a wax and about 0.1 to 1% by weight of a particulate antiblocking agent.

10. The mold release sheet of claim 9 wherein said regenerated cellulose base sheet contains a polyhydric alcohol softener and an anchoring resin.

11. The mold release sheet of claim 9 wherein said cellulose base sheet contains about 8 to 20% by weight of a polyhydric alcohol.

12. The mold release sheet of claim 11 wherein said polyhydric alcohol is glycerol.

References Cited by the Examiner

UNITED STATES PATENTS

| | | | |
|---|---|---|---|
| Re. 23,164 | 11/1949 | Tompkins | 260—27 |
| 2,555,274 | 5/1951 | Metz | 260—27 |
| 2,720,496 | 10/1955 | Bushnell | 60—874 |
| 2,772,247 | 11/1956 | Schroeder | 260—874 |
| 3,057,756 | 10/1962 | Cornwell | 260—27 |

FOREIGN PATENTS 595,005 11/1947 Great Britain.

LEON J. BERCOVITZ, *Primary Examiner.*

F. McKELVEY, *Assistant Examiner.*